BEST AVAILABLE COPY

C. A. FREDERICKS.

Speaking-Tubes.

No. 5,588. Reissued Oct. 7, 1873.

Witnesses:
A. W. Almqvist
Alex F. Roberts

Inventor:
C. A. Fredericks
PER Munn & Co.
Attorneys.

UNITED STATES PATENT OFFICE.

CHRISTIAN A. FREDERICKS, OF BROOKLYN, NEW YORK.

IMPROVEMENT IN SPEAKING-TUBES.

Specification forming part of Letters Patent No. 135,421, dated February 4, 1873; reissue No. 5,588, dated October 7, 1873; application filed August 21, 1873.

*To all whom it may concern:*

Figure 1:
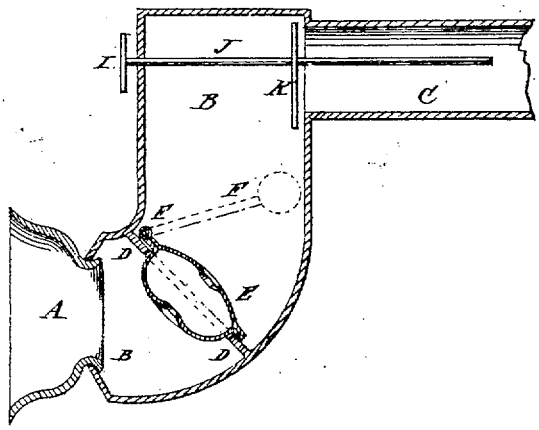
Figure 2:
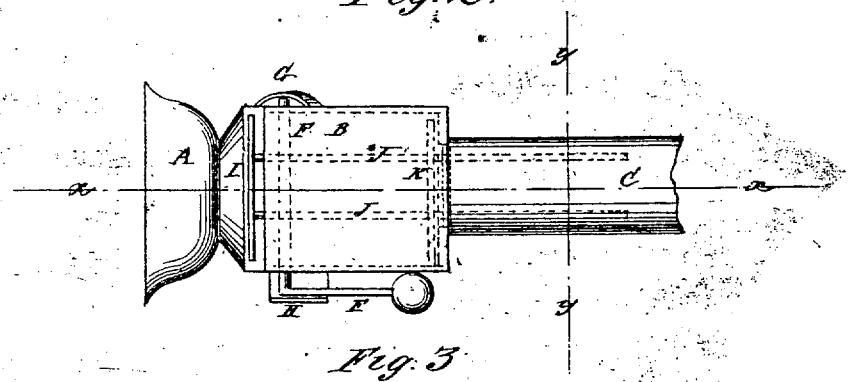
Figure 3:
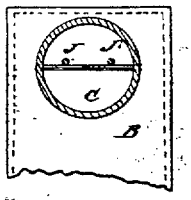

Be it known that I, CHRISTIAN A. FREDERICKS, of Brooklyn, in the county of Kings and State of New York, (formerly of the city of New York, in said State,) have invented a new and useful Improvement in Speaking-Tubes, of which the following is a specification:

Figure 1 is a detail sectional view of a part of a speaking-tube illustrating my invention taken through the line *x x*, Fig. 2. Fig. 2 is a top view of the same. Fig. 3 is a detail section of the same taken through the line *y y*, Fig. 2.

Similar letters of reference indicate corresponding parts.

My invention has for its object to improve the construction of the part of speaking-tubes adjacent to the mouth-piece, so as to make it more reliable in use and less liable to get out of order; and it consists in the arrangement of the valve in the valve-chamber, and of the guards with the valve-crank wire, and in the construction of the indicator, as hereinafter more fully described.

A represents the mouth-piece. B represents the chamber, to which the mouth-piece A is attached, and in which the valve is placed, and with which the whistle is connected. C represents the body of the tube. D is the valve-seat, which is formed by attaching to the walls of the valve-chamber B the edges of a plate having a hole through its center of sufficient size for the free passage of the air. The seat D is placed in an inclined position, so that the valve E may be held down upon it by its own weight. The valve E, at its upper edge, is attached to a wire, F, which passes through and works in holes formed in the walls of the chamber B. One end of the wire F is bent into the form of a crank, to enable the valve E to be conveniently raised by it. The other end of the wire F rests against a guard, G, attached to the outer side of the valve-chamber B. The crank-end of the wire F rests against the guard H attached to the crank-side of the valve-chamber B. The guards G H prevent any longitudinal movement of the wires F, and thus cause the valve E to always come down squarely upon its seat. The valve-seat D and valve E are arranged to occupy such an inclined position in relation to a vertical line that the valve will fall into its proper position by its own weight. The whistle may be formed in the valve E, and may, in fact, form said valve, as shown in Fig. 1.

It is an important feature in the within-described arrangement of the valve-seat that the interior sides of that portion of the speaking tube or chamber in which the valve works should be made flat or straight.

I is the indicator-plate, which is attached to the ends of two wires, J, which pass through holes in the upper part of the valve-chamber B, and to which, within said chamber, is attached a plate, K, in such a position as to cover the mouth of the pipe C when the indicator is pushed back, as shown in Fig. 1.

By this construction, when the other end of the tube is blown into, the first effect is to push out the indicator, and then to sound the whistle.

The ends of the wires J pass into the pipe C, as shown in Figs. 2 and 3, and rest upon and are supported by a wire passing across the inner end of said pipe C, as shown in Fig. 3.

I claim as my invention and desire to secure by Letters Patent—

1. The indicator composed of the plate I, rods J J, and plate K, in combination with a speaking-tube, substantially as shown and described.

2. The arrangement of the inclined valve-seat D, in combination with the flat interior sides of a speaking-tube, whereby the valve, closing by weight, is guided by said interior sides of the tube, substantially as shown and described.

CHRISTIAN A. FREDERICKS.

Witnesses:
MICHAEL RYAN,
FRED. HAYNES.